United States Patent
Hupperich et al.

(10) Patent No.: US 6,298,825 B1
(45) Date of Patent: Oct. 9, 2001

(54) METHOD FOR IGNITING A MULTI-CYLINDER RECIPROCATING GAS ENGINE BY INJECTING AN IGNITION GAS

(75) Inventors: Patrick Hupperich, Sankt Augustin; Markus Umierski, Stolberg, both of (DE)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 09/485,843

(22) PCT Filed: Jun. 2, 1999

(86) PCT No.: PCT/EP99/03806

§ 371 Date: Feb. 18, 2000

§ 102(e) Date: Feb. 18, 2000

(87) PCT Pub. No.: WO99/66186

PCT Pub. Date: Dec. 23, 1997

(30) Foreign Application Priority Data

Nov. 27, 1998 (DE) .............................. 198 54 776

(51) Int. Cl.[7] .............................. F02D 19/02; F02D 41/40; F02P 19/00
(52) U.S. Cl. ..................... 123/431; 123/145 A; 123/532; 123/534
(58) Field of Search ............................ 123/27 GE, 143 R, 123/143 B, 145 A, 250, 298, 300, 304, 527, 532, 534, 431

(56) References Cited

U.S. PATENT DOCUMENTS

| | | | |
|---|---|---|---|
| 1,780,499 | * 11/1930 | Novelli | 123/298 |
| 4,546,740 | * 10/1985 | Clements et al. | 123/143 B |
| 4,907,565 | * 3/1990 | Bailey et al. | 123/27 GE |
| 5,146,881 | 9/1992 | Pfefferle | 123/145 A |
| 5,315,973 | 5/1994 | Hill et al. | 123/304 |
| 5,771,857 | 6/1998 | Willi | 123/305 |

FOREIGN PATENT DOCUMENTS

| | | |
|---|---|---|
| 44 19 429 | 12/1995 | (DE) . |
| 09025823 | 1/1997 | (JP) . |

OTHER PUBLICATIONS

Willi et al, "Design and Development of a Direct Injected, Glow Plug Ignition–Assisted, Natural Gas Engine", Journal of Engineering for Gas Turbines and Power, Oct. 1995, vol. 117, pp. 799–803.

* cited by examiner

Primary Examiner—Tony M. Argenbright
(74) Attorney, Agent, or Firm—Venable; Norman N. Kunitz

(57) ABSTRACT

An ignition method for a multi-cylinder reciprocating gas engine wherein, in order to start a combustion cycle, a compressed, substantially homogeneous and not self-igniting combustion gas-air mixture contained in the corresponding cylinder chamber to be fired is ignited by the direct injection of a small amount of combustion gas. The injected small amount of combustion gas, which serves as the ignition gas, is injected onto a hot surface in the region of the combustion chamber. The beginning of the injection is predetermined depending on the position of the crankshaft, and is controlled by an engine control unit.

10 Claims, 3 Drawing Sheets

METHOD FOR IGNITING A MULTI-CYLINDER RECIPROCATING GAS ENGINE BY INJECTING AN IGNITION GAS

BACKGROUND OF THE INVENTION

Reciprocating gas engines, which are operated with combustion gases having a high energy content, can be operated either according to the Otto method or also according to the so-called diesel-gas method. In both cases, a mixture of air and combustion gas is sucked in and compressed. With the Otto method, ignition occurs through spark-over between the electrodes of a spark plug. With the diesel gas method, ignition occurs via a so-called pilot injection, meaning a metered amount of a self-igniting, liquid ignition fuel, as a rule diesel fuel, is injected with high pressure into the compressed combustion gas-air-mixture to initiate the combustion. This injected ignition fuel self-ignites and thus forms a multitude of spatially distributed ignition sources. The energy released as a result of the injected ignition fuel is considerably higher than the spark energy from a spark plug. This method has advantages with respect to the maintenance costs and the idle times since the spark plugs are subjected to high wear owing to the increase in ignition energy, which decreases the service life drastically.

With a gas engine operating according to the Otto method, full use is made of the special advantage of a considerably lower pollutant emission, particularly of nitrogen oxides, as compared to the gasoline engines or the diesel engines. With a gas engine operating according to the diesel method, the pollutant emission is increased, relative to the "pure" gas engine operating according to the Otto method, because of the fuel injected for the ignition. Until now, the diesel gas method could therefore be used only for very large stationary gas engines with a volume of 20,000 $cm^3$ and more per cylinder. This is due to the fact that the additional discharge of pollutants caused by the ignition fuel could only be kept low for large engines of this type, relative to the total pollutant discharge of the gas engine. The problem results from the injection process being controlled by the rotational movement of a camshaft and a specified cam profile, so that start and end of the injection and thus also the amount injected with a specified injection fuel admission pressure are not influenced, even though they depend on the speed.

German Patent A-44 19 429 discloses a method for operating a self-igniting, mixture-compressing gas engine, which uses an ignition gas in place of a liquid ignition fuel. It is advantageous to use as ignition gas the same combustion gas that is also used to operate the gas engine in the form of a combustion gas-air-mixture. With the known method a small antechamber is assigned to each cylinder that forms the main combustion chamber. The ignition gas is injected into the antechamber with a pressure that is higher than the compression pressure in the main combustion chamber. The advantage of this method is that only one type of combustion fuel is required, so that a reduction of the emission values can be achieved, particularly for nitrogen oxides. The disadvantage of this method is that it requires an involved engine design resulting from the use of antechambers.

SUMMARY OF THE INVENTION

It is the object of the invention to create an ignition process for gas engines, which simplifies the structural expenditure as well as the engine operation.

This object is solved according to the invention with an ignition method for a multi-cylinder reciprocating gas engine. To initiate an operating cycle, a compressed and essentially homogeneous combustion gas-air-mixture that is not self-igniting and is contained in the respective cylinder space to be fired is ignited according to this method by directly injecting a small amount of combustion gas as ignition gas onto a hot surface. The start of the injection can be specified by way of an engine control unit and in dependence on the crankshaft position. With this method, the combustion gas-air-mixture is initially compressed inside the respective cylinder and is present in homogeneous form near the end of the compression lift. However, as a lean mixture it does not meet the self-ignition requirements due to the mixing ratio. For the ignition, the small amount of combustion gas is injected at the end of the compression lift as ignition gas directly and under pressure into the combustion chamber. It is advisable to use as ignition gas the same combustion gas that is also used in the combustion gas-air-mixture, preferably without an essential amount of mixed-in air. The direct injection of the ignition gas causes practically a point-type enrichment of the mixture in the injection region, through which the self-ignition conditions are adjusted over a narrowly defined range.

In order to determine the ignition location inside the combustion chamber and also shorten the ignition delay, the ignition gas is injected via an ignition aid in the form of a hot surface, which surface has a temperature that is clearly above the combustion chamber surface temperatures. This hot surface can be provided, for example, in the form of an incandescent body that projects into the combustion chamber and is connected with a source for providing heat energy. The source can be a current source, for example, with which the required surface temperature of the incandescent body is maintained during the start-up phase of the engine. Following a corresponding operating time, however, the incandescent body has a sufficiently high temperature level, so that the current source can be turned off. However, other structural parts in the cylinder chamber can also serve as hot surface, e.g. projections or the like.

The start of the fuel conversion is respectively controlled by the release of the amount of ignition gas to be injected, so that it is possible to control the combustion process in the same way as the ignition moment of a spark ignition.

The ignition method according to the invention can be used advantageously in particular for methane-containing gases having a low energy content, the so-called lean gases, because the ignition energy made available is high, owing to the targeted and locally fixed self-ignition. Thus, a secure ignition is ensured even with energy-poor gases, but also with lean combustion gas-air-mixtures. Lean gases of this type can be obtained, for example, from coke gas, blast furnace gas or even converter gas in the steel-producing industry, but also as pyrolysis gas from the incineration of waste products.

It is possible in principle to use a central combustion gas source under high pressure to inject the ignition gas with a correspondingly high pressure directly into the individual cylinder chamber to be fired, in the manner of a common-rail injection system known from standard diesel engines. However, one advantageous embodiment of the invention provides that the ignition gas be metered in from an ignition gas accumulator that is assigned respectively to one cylinder and by way of a controllable ignition valve. In that case, the ignition gas accumulator is connected on the one hand to a combustion gas supply and, on the other hand, to a cylinder chamber. The ignition gas accumulator can be admitted by way of a valve arrangement with the maximum combustion chamber pressure by using operating gases from the cylinder chamber. This arrangement has the advantage that a relatively small-volume ignition gas accumulator can be charged at a pressure of approximately 4 to 8 bar by using the pressure generator for the combustion gas supply, which is normally available anyway for charging the gas engines. This pressure is not sufficient to inject the ignition gas amount counter to the compression pressure into the respective cylinder chamber. As soon as the ignition gas accumulator is filled with ignition gas, the ignition gas accumulator is connected to a cylinder that has just been fired. Thus, the ignition gas content in the ignition gas accumulator is compressed with the maximum operating cycle pressure by feeding in a small amount of the operating gas from the fired cylinder chamber. This operating pressure is with certainty higher than the compression pressure in the cylinder to be ignited by way of the ignition gas accumulator. The ignition gas is therefore available to this cylinder with high pressure at the moment of ignition and can be injected into the respective cylinder chamber by simply opening an ignition valve. If this valve is kept open until the load change in the respective cylinder, then the pressure inside the ignition gas accumulator is reduced far enough, so that following the closing of the ignition valve the central combustion gas supply pressure is sufficient to fill the accumulator once more.

The ignition readiness of the ignition gases, which are mixed in this way with a small amount of hot operating gases from the pressure-generating cylinder chamber, is not reduced in this way. The admixture of hot operating gases offers the advantage that additional heat is added to the ignition gas, together with the increase in pressure in the ignition gas accumulator, which compensates for the cooling down due to the expansion of the ignition gas when it is injected into the cylinder chamber.

While respectively one "neighboring" cylinder chamber must be tapped for the above-described generating of ignition gas pressure in accordance with the specified ignition sequence, so as to increase the ignition gas pressure in the ignition gas accumulator, one advantageous, further embodiment of the invention provides that an additional pressure accumulator be added to the ignition gas accumulator. On the one hand, this additional accumulator is admitted with the maximum combustion chamber pressure from the cylinder chamber associated with the ignition gas accumulator while, on the other hand, its gas content can admit the ignition gas accumulator with pressure. The advantage of this method is that the maximum operating pressure of the preceding operating cycle of the cylinder to be respectively fired is made available for compressing the ignition gas. It also has the advantage that the ignition gas accumulator and the pressure accumulator, including the associated valves, can be combined to form a structural unit serving as ignition gas metering device, which can be inserted into the cylinder head in the manner of an injection nozzle or a spark plug. The arrangement further has the advantage that return valves can be used for a portion of the valve arrangement, consisting of several valves, which correspondingly reduces the expenditure for valves that must be actuated via the engine control unit.

An additional embodiment of the invention provides that the surface of the incandescent body is provided at least in some sections with a material that functions as catalyst for the combustion gas. This measure can result in a further reduction in the ignition temperature if the ignition readiness of the enriched combustion gas-air-mixture is further improved through a corresponding catalytic conversion of the gas forming the ignition gas.

Another embodiment of the invention provides that energy is supplied to the incandescent body in dependence on specifiable temperatures. With this measure, it can be ensured that for the most varied load and speed ranges the incandescent body has a sufficiently high temperature level for igniting the ignition gas. In this case, the type and manner in which the temperature is specified can be made to depend on how the respective internal combustion engine is used. Thus, for stationary engines, which are essentially operated continually with the same load, it can be sufficient to connect the energy supply for the incandescent body to a quiet running control, meaning to detect the temperature of the incandescent body only indirectly. As soon as an increase in the running noise is detected via the quiet running control, the energy supply to the incandescent body can be increased simultaneously with other measures, in view of the composition of the combustion gas-air-mixture that must be supplied to the engine, so that a reliable ignition is achieved. It is also possible to measure the surface temperature of a selected location in the combustion chamber and, if a specified desired value for this combustion chamber surface temperature is not reached, to supply the required heating energy in the first place to the incandescent body, preferably in the form of electrical energy or, if heating energy is supplied continuously, to increase it correspondingly. In particular for piston-type internal combustion engines, operated with a changeable load, such as piston-type internal combustion engines in motor vehicles, it is advisable to provide a desired value or a group of desired values for the heating energy supplied to the incandescent body by storing a parameter in the engine control unit. With this, it is possible to take into account the Lambda values that differ for the various load cases, the effects of the speed and the respectively desired load. In this case as well as for the previously described measures, it is advisable for the control and/or regulation to detect the current temperature of the incandescent body, for example by detecting the heating coil resistance change.

BRIEF DESCRIPTION OF THE DRAWINGS

The invention is explained in further detail with the aid of schematic drawings, which show in.

Figure 1:
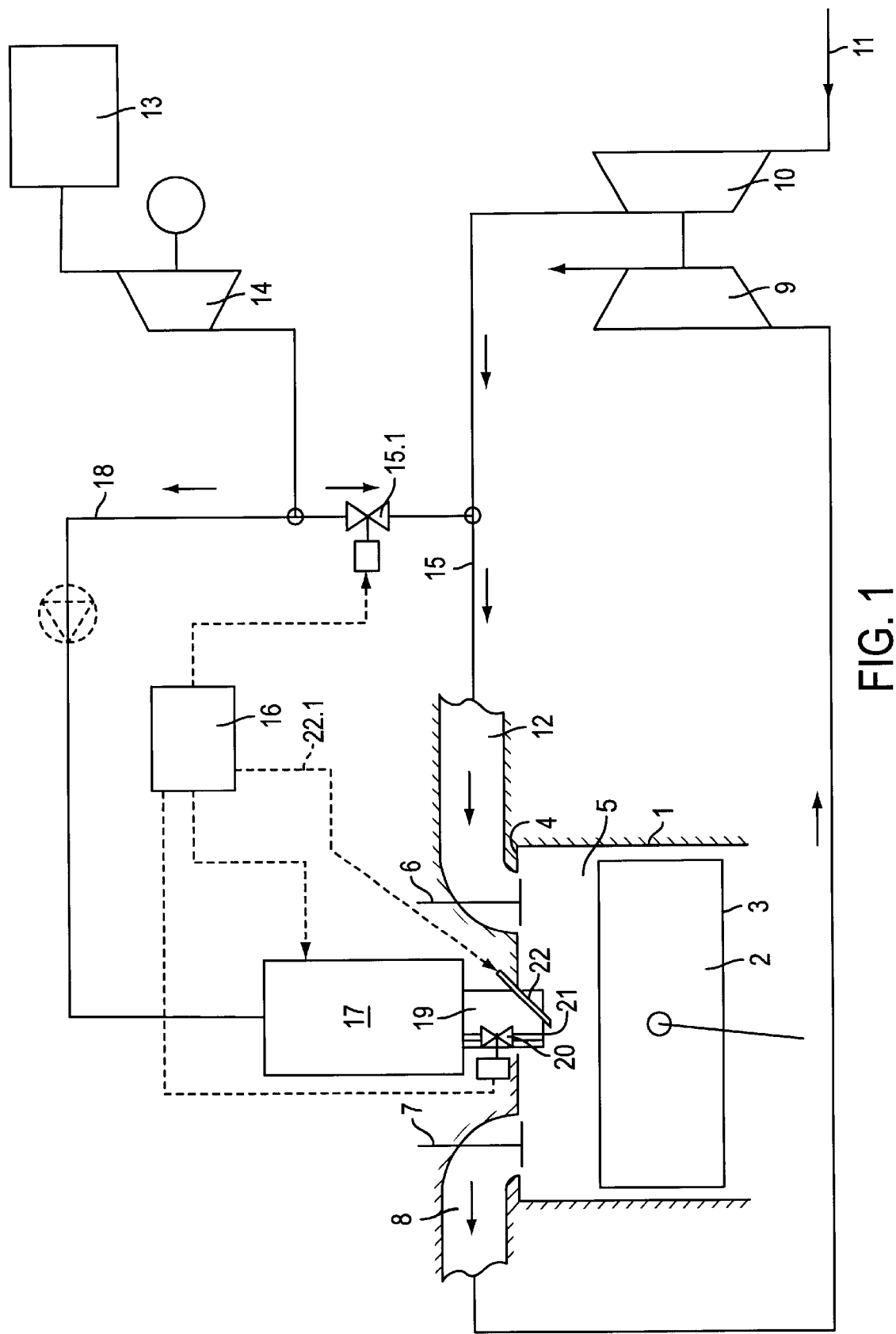
FIG. 1 a cylinder for a multi-cylinder reciprocating gas engine and its gas supply.

The method is explained further in FIG. 1 with the aid of a cylinder 1 for a multi-cylinder reciprocating gas engine. The combustion chamber 5 is limited by the piston bottom 2 of piston 3, when it is positioned in the upper dead center, as well as by the cylinder head 4, wherein the cylinder head 4 can have a standard design. The cylinder head 4 is provided with a gas intake valve 6 and a gas discharge valve 7, which are actuated in the standard way either mechanically and crankshaft synchronous, or with fully variable valve drives by means of an engine control unit and based on the specified loads. Together with the gas discharge conduits for the remaining cylinders, which are not shown in further detail here, the gas discharge conduit 8 assigned to the gas discharge valve 7 is conducted over an exhaust gas turbine 9 that drives a turbo charger 10. Air is sucked in by the turbo charger 10 via a feed line 11 and, with a corresponding increase in pressure, is supplied to the individual cylinders in the combustion chamber by way of the intake conduits 12.

In order to generate the required combustion gas-air-mixture for the operation, combustion gas is supplied with a pressure of 4 to 8 bar, for example, from a combustion gas source 13 via a pressure generator, e.g. a motorized charger 14, and a joint feed line 15 to all the air intake conduits 12, or combustion gas is supplied to those regions of gas intake conduits 12 that are assigned directly to the individual cylinders by way of one or several valves 15.1, which are actuated by an engine control unit 16.

An ignition gas-metering device 17 is arranged at the cylinder head 4 and is also supplied with combustion gas at the predetermined pressure by the charger 14 and via a feed line 18. The ignition gas metering device 17 is provided with a valve arrangement, not shown in further detail here, which can be actuated via an engine control unit 16. In this way, an ignition gas is injected respectively just prior to the upper dead center into the compressed, homogeneous combustion gas-air-mixture present in the combustion chamber 5, in accordance with the operating cycle and by way of the ignition gas metering device 17.

The pressure for the ignition gas to be injected must be higher than the compression pressure, so that the ignition gas to be injected must be available with a correspondingly high pressure at the ignition gas-metering device 17. In principle, it is possible to provide an additional compressor in the feed line 18 in addition to the individual ignition gas metering devices 17, which is designed to compress the combustion gas to the necessary pressure of approximately 180 to 250 bar. However, this requires a correspondingly high energy and design expenditure, so that the additional compressor is only indicated in the feed line 18.

The ignition gas metering device 17 is inserted into the cylinder head 4 in the manner of a spark plug and comprises a projecting part 19 that is provided with an injection conduit 21 having an ignition valve 20 that can be actuated via the engine control unit.

An incandescent body 22 is provided as hot surface in the discharge region of the injection conduit 21 for the ignition gas metering device 17, e.g. in the form of an electrically heated glow plug, which the ignition gas jet strikes. This glow plug 22 must be heated only until the surface of the glow plug is hot enough, following a successful start, so that it does not cool down even during the following load changes. It must have a temperature that ensures a defined ignition of the injected ignition gas, owing to the locally limited drop in the ignition temperature during the ignition gas injection, thus igniting the compressed, as a rule lean combustion gas-air-mixture in the combustion chamber 5. It is important that the ignition gas is injected directly into the combustion chamber, meaning that the ignition process can be used for standard engine designs. Separate ignition chambers, antechambers, or the like are not required, but can be provided.

The glow plug 22 in the exemplary embodiment, shown schematically herein, is connected to the engine control unit 16, as indicated via the connecting line 22.1. The connecting line 22.1 represents an electrical supply line, which is used to supply electrical energy for heating up the glow plug. Depending on the design of actuation or control, it can also comprise a signal line with which the temperature level of glow plug 22, which is important to the ignition, is detected and processed in the engine control unit 16. During the start-up of the gas engine, the glow plug 22 is initially heated up via the engine control unit, so that a sufficiently high temperature exists, thereby ensuring a reliable ignition of the ignition gas to be injected. The energy supply must then be maintained long enough and at a level so that the temperature conditions in the combustion chamber ensure an ignition of the ignition jet without problems. In this way, the temperature of glow plug 22 can be monitored constantly by the engine control unit, so that the energy supply is reduced or completely shut down in case a predetermined desired temperature value is exceeded. If a predetermined desired temperature value is not reached or if there is a tendency to a temperature drop near the predetermined desired temperature value, heat energy can again be supplied via the engine control unit. As a rule, a temperature of at least 600° C. must be maintained.

The engine control unit 16 in this case can also contain parameters for the minimum temperature to be maintained in the glow plug, which parameters take into account the desired load, the speed, but also the Lambda value for the combustion gas-air-mixture that must be supplied to the gas engine.

The direction of the ignition gas leaving the ignition gas-metering device 17 in the form of a jet can be oriented with respect to the gas movement inside the combustion chamber. FIG. 1 illustrates an injection direction that is perpendicular to the piston bottom to simplify the drawing. However, it may be advisable to direct the injection at a slant against the intake valve 6. The gas engine can respectively also comprise several intake valves and/or discharge valves.

Figure 2:
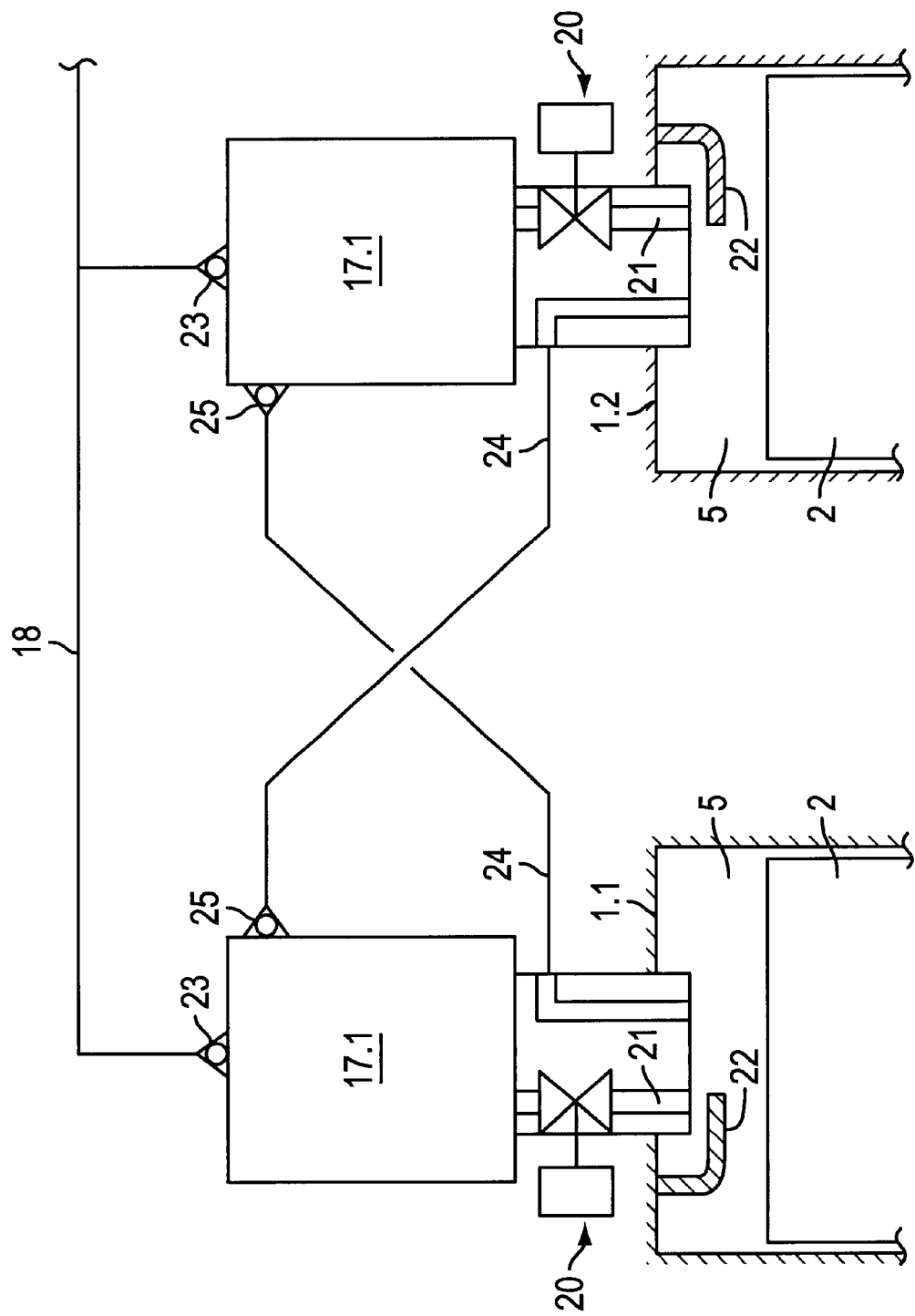
FIG. 2 an arrangement including a device for metering in the ignition gas and integrated pressure generator.

FIG. 2 shows a basic diagram of an exemplary embodiment of the ignition gas metering device 17, which is designed such that the compressing of the ignition gases can be effected by the gas engine itself. Shown are two cylinders 1.1 and 1.2, coordinated with each other for the ignition sequence, which are respectively provided with an ignition gas-metering device 17. Each ignition gas metering device 17 in this case essentially comprises an ignition gas accumulator 17.1 that is connected to the combustion gas feed line 18 via a valve 23, e.g. a return valve.

Each ignition gas accumulator 17.1 furthermore is connected via a connecting line 24 respectively to the combustion chamber 5 of the other cylinder, wherein a valve 25 is arranged in the connecting line 24, e.g. a return valve that opens in the direction of ignition gas accumulator 17.1. This return valve 25 is adjusted such that it opens up if the operating cycle runs down in the respective cylinder, for example the cylinder 1.2. Thus, a small amount of operating gas is conducted with the operating pressure as maximum pressure from the fired cylinder into the ignition gas accumulator 17.1 of the other cylinder, e.g. the cylinder 1.1. The ignition gas contained in this accumulator is thus compressed to the maximum pressure tapped at the other cylinder. As soon as the ignition process in cylinder 1.1 is to be initiated, the ignition gas conduit 21 is opened through a corresponding actuation of the ignition gas valve 20. Thus, a corresponding ignition gas amount can flow into the combustion chamber, counter to the low compression pressure in the cylinder 1.1, and the homogeneous, compressed combustion gas-air-mixture therein is ignited once the ignition gas makes contact with the hot surface of the glow plug 22. The ignition gas valve 20 in this case remains open until the piston 3 of cylinder 1.1 passes through the lower dead center range for the load change. The ignition gas valve 20 is then closed. The pressure in the ignition gas accumulator 17.1 is thus reduced enough, so that once the return valve 23 is opened, the desired ignition gas amount can again enter into the ignition gas accumulator 17.1 via the feed line 18.

During the operating cycle in cylinder 1.1, the ignition gas in the ignition gas accumulator of cylinder 1.2 is then compressed accordingly via a connecting line 24, so that the ignition gas is again available for the following operating cycle with the required high pressure.

Figure 3:
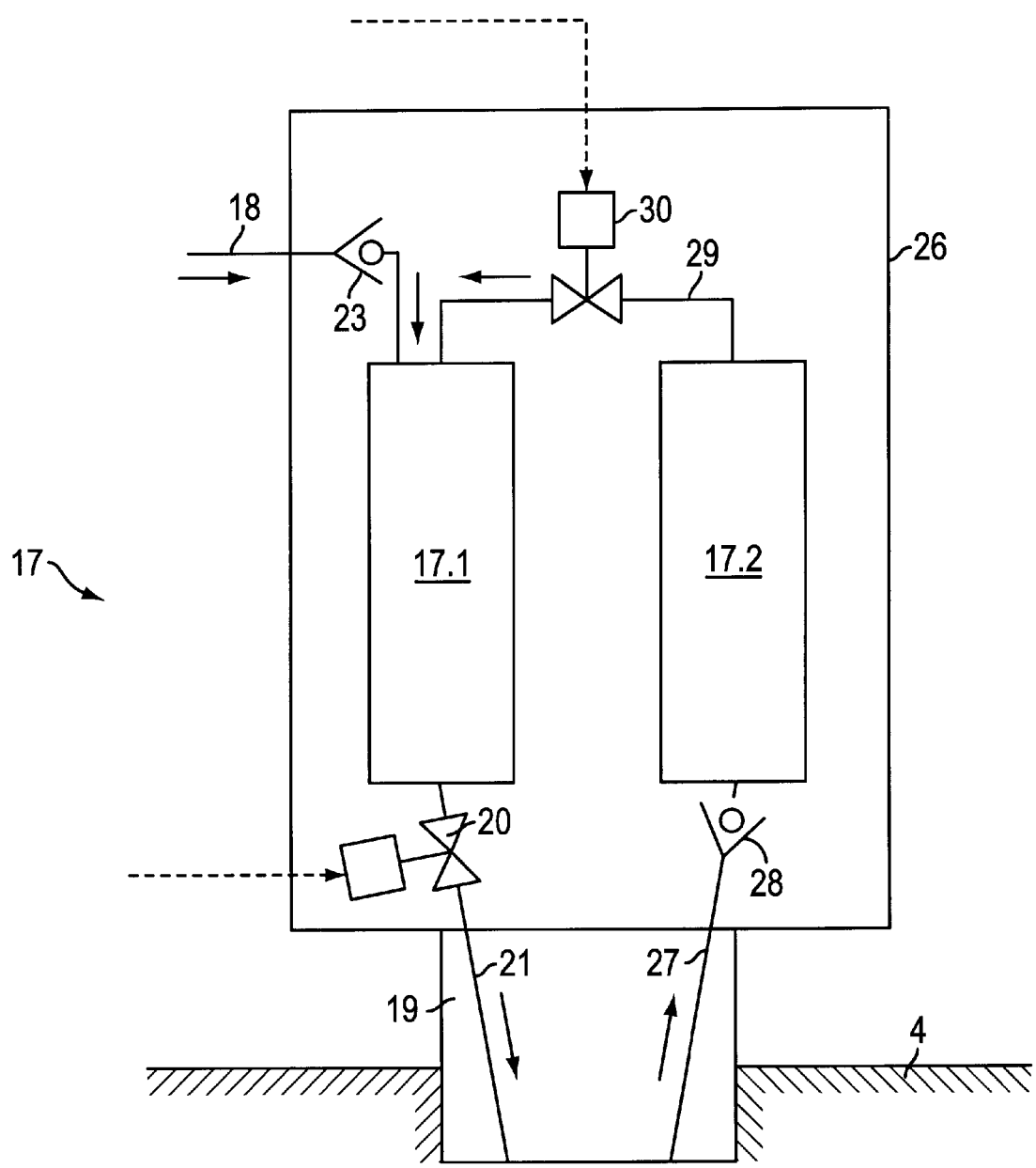
FIG. 3 a device for metering in ignition gas, as closed structural unit.

In FIG. 3, a special embodiment for the ignition gas metering device 17 is shown schematically. This embodiment essentially comprises a housing 26 that is connected to projecting part 19. An ignition gas accumulator 17.1 as well as a pressure accumulator 17.2 are arranged inside this housing. The ignition gas accumulator 17.1 is connected via a feed line 18 to the combustion gas supply 13, as previously described with the aid of FIGS. 1 and 2. In this case, a valve 23, e.g. in the form of a return valve, ensures that no ignition gas can flow out in case of a pressure increase in the ignition gas accumulator 17.1. The ignition gas accumulator 17.1 can be opened via an ignition valve 20 that can be actuated by an engine control unit 16, so that the ignition gas can travel via the injection conduit 21 into the combustion chamber of the respective cylinder.

A pressure conduit 27 is furthermore arranged inside the projecting part 19, which is connected to the pressure accumulator 17.2 and contains a valve 28, for example a return valve which opens up only in case of excess pressure in the combustion chamber of the respective cylinder.

The pressure accumulator 17.2 is connected to the ignition gas accumulator 17.1 via a connecting line 29, which also contains a valve 30 that can be actuated by the engine control unit 16.

If the ignition valve 20 is open and the valve 30 is closed, ignition gas can flow over the feed line 18 into the ignition gas accumulator 17.1, provided the piston is located in the lower dead center during the load change phase following an operating cycle. At the start of the lift-off phase, the ignition valve 20 is closed via the engine control unit.

Owing to the fact that during the ignition of the combustion gas-air-mixture, in the preceding operating cycle, a gas pressure exists in the combustion chamber that is clearly above the compression pressure, a correspondingly small amount of operating gas is pushed into the pressure accumulator 17.2 via the conduit 27 and by opening the return valve 28. The pressure level of this operating gas corresponds approximately to the maximum pressure. This operating gas is composed of shares of combustion gas-air-mixture inside the combustion chamber that have not yet burnt, as well as of a corresponding share of burnt exhaust gases.

If ignition gas is to be pressed counter to the compression pressure into the combustion chamber for the next operating cycle of the respective cylinder, then the valve 30 is opened at the same time, or even better just before the ignition valve 20 is opened. As a result, the operating gas that is present in the pressure accumulator 17.2 under a higher pressure can flow into the ignition gas accumulator and, accordingly, can increase the pressure level in the ignition gas accumulator 17.1. Thus, the ignition gas is pressed into the combustion chamber through the conduit 21 and counter to the compression pressure. It is advantageous in this case if the pressure accumulator 17.2 has a slightly higher volume than the ignition gas accumulator 17.1.

According to a modification of the operational mode, described with the aid of FIG. 1, it is also possible to generate the homogeneous combustion gas-air-mixture required for the operation in such a way that only air is sucked in during the intake cycle via the gas intake conduits 12 and that the combustion gas present with a corresponding admission pressure is injected during the intake cycle via the gas metering device 17 into the cylinder chamber 5, in an amount that corresponds to the load requirement. The valve 15.1, shown in FIG. 1, is omitted so that the total amount of combustion gas for the cylinder is supplied via the feed line 18 and the combustion gas-metering device 17.1. For the metering of the combustion gas, the engine control unit 16 correspondingly actuates the ignition valve 20. Owing to the fact that the injection occurs during the intake cycle, meaning at a lower pressure, a self-ignition of the combustion gas is impossible despite the presence of the hot surface of glow plug 22.

What is claimed is:

1. An ignition method for a multi-cylinder reciprocating gas engine comprising: injecting a compressed and essentially homogeneous, non self-igniting combustion gas-air-mixture present in the respective cylinder chamber to be fired through directly injecting a small metered amount of combustion gas, as ignition gas, onto a hot surface for the purpose of starting an operating cycle specifying and controlling the start of the injection in dependence on the crankshaft position by use of an engine control unit;

providing the small amount of ignition gas to be metered by removing the ignition gas from an ignition gas accumulator that is assigned to a respective cylinder via a controllable ignition valve that is connected between a combustion gas supply and the cylinder chamber; and, supplying the ignition gas accumulator with operating gases from the cylinder chamber at the maximum combustion chamber pressure via a valve arrangement.

2. A method according to claim 1, further comprising: assigning an additional pressure accumulator to the ignition gas accumulator, which is supplied with the maximum combustion chamber pressure from the cylinder chamber assigned to the ignition gas accumulator while its gas content is supplied to the ignition gas accumulator with pressure.

3. A method according to claim 1, further comprising providing the hot surface as an incandescent body that is arranged in the injection region and is connected to a source for supplying heat energy.

4. A method according to claim 3, further comprising providing the surface of the incandescent body, at least in part, with a material having a catalytic effect for the combustion gas.

5. A method according to claims 1, wherein in order to generate the homogeneous combustion gas-air-mixture, metering the amount of combustion gas so that it corresponds to the load requirements and injecting the metered amount into the cylinder chamber during the intake cycle.

6. A method according to claims 3, further comprising supplying the energy for the incandescent body in dependence on specified temperature values.

7. An ignition method for a multi-cylinder reciprocating gas engine comprising: igniting a compressed and essentially homogeneous, non self-igniting combustion gas-air-mixture present in a respective cylinder chamber to be fired by directly injecting a small amount of combustion gas, as an ignition gas, onto a hot surface for the purpose of starting an operating cycle; specifying and controlling the start of the injection in dependence on the crankshaft position by use of an engine control unit; and, providing the hot surface as an incandescent body that is arranged in the injection region and is connected to a source for supplying heat energy.

8. The method according to claim 7 further comprising, providing the surface of the incandescent body, at least in part, with a material having a catalytic effect for the combustion gas.

9. The method according to claim 7 further comprising supplying the energy for the incandescent body in dependence on specified temperature values.

10. An ignition method for a multi-cylinder reciprocating gas engine comprising: igniting a compressed and essentially homogeneous, non self-igniting combustion gas-air-mixture present in a respective cylinder chamber to be fired by directly injecting a small amount of combustion gas, as an ignition gas, onto a hot surface for the purpose of starting an operating cycle; specifying and controlling the start of the injection in dependence on the crankshaft position by use of an engine control unit; and wherein, in order to generate the homogeneous combustion gas-air-mixture, metering the amount of injected combustion gas to correspond to the load requirements and injecting the metered amount into the cylinder chamber during the intake cycle.

* * * * *